United States Patent [19]

Rosenthal et al.

[11] Patent Number: 5,918,210

[45] Date of Patent: Jun. 29, 1999

[54] BUSINESS QUERY TOOL, USING POLICY OBJECTS TO PROVIDE QUERY RESPONSES

[75] Inventors: Kathryn A. Rosenthal, Beaconsfield, United Kingdom; Andrew J. Berner, Irving, Tex.

[73] Assignee: Electronic Data Systems Corporation, Plano, Tex.

[21] Appl. No.: 08/660,638

[22] Filed: Jun. 7, 1996

[51] Int. Cl.$^6$ ....................................................... G06F 17/60
[52] U.S. Cl. .................................. 705/7; 705/7; 707/103; 707/104; 707/203
[58] Field of Search .................................. 705/1, 7, 8, 9, 705/10; 707/5, 103, 104, 203

[56] References Cited

U.S. PATENT DOCUMENTS

| | | |
|---|---|---|
| 5,386,559 | 1/1995 | Eisenberg et al. . |
| 5,406,477 | 4/1995 | Harhen . |
| 5,434,791 | 7/1995 | Koko et al. . |
| 5,440,730 | 8/1995 | Elmasri et al. . |
| 5,449,365 | 9/1995 | Anderson et al. . |
| 5,581,755 | 12/1996 | Koerber et al. . |
| 5,630,127 | 5/1997 | Moore et al. . |
| 5,675,745 | 10/1997 | Oku et al. . |
| 5,745,901 | 4/1998 | Entner et al. . |

OTHER PUBLICATIONS

Proceedings of the 12th International Phoenix Conference on Computers and Communications, Tempe, US, Mar. 23–26 1993, IEEE, US, pp. 203–209, Abad A. Shah et al., "Renovation of Complex Objects in the Temporal Object System".

Proceedings of the International Conference on Data Engineering, Taipei, No. Conf. 11, Mar. 6–10, 1995, Yu P.S., Chen A.L.P. (Editors), pp. 165–172, Ra Y.G. et al., "A Transparent Object–Oriented Schema Change Approach using View Evolution".

*Primary Examiner*—Robert A. Weinhardt
*Attorney, Agent, or Firm*—Ann C. Livingston; L. Joy Griebenow

[57] ABSTRACT

A method of modeling an enterprise so that its policy changes as well as its current components and operations are represented in a database (11), and a method of using a computer to query the database. The enterprise is modeled using classes of objects and associated methods. During operation, a query about data in the database (11) is received from a user, with the query calling for the use of at least one method to answer the query. The database (11) is accessed to determine whether the method is affected by a policy change, where different policies are represented by policy objects. If so, the user is provided with policy choices. A policy selection is received, and the query is answered, using an implementation of the method based on the policy selection (FIG. 2).

15 Claims, 3 Drawing Sheets

BUSINESS QUERY TOOL, USING POLICY OBJECTS TO PROVIDE QUERY RESPONSES

TECHNICAL FIELD OF THE INVENTION

This invention relates generally to databases and to software for accessing them, and particularly to modeling a business enterprise in a database and reporting information from the database. More particularly, a reporting tool extends the benefits of object-oriented technology to an end user.

BACKGROUND OF THE INVENTION

Object-orientation concepts have been applied to developing databases as well as applications programming. Object-orientation features, such as abstract data types and encapsulation, have been combined with database capabilities to provide realistic models of real world things, ideas, and events. However, a frequent complaint of those who need information from databases is that data cannot be conveniently retrieved as useful information. Object-oriented databases have the reputation of being rich in functionality but poor in performance. There is plenty of data but it is not useful. Object-oriented concepts have not adequately benefitted the end users, the knowledge workers, who need information, not raw data. Too much of the usefulness of information depends on an individual's technical skill or acquired knowledge applied to data from a database.

The basic idea of object-oriented software is the use of "objects". Objects are software entities comprising data structures and operations on the structures' data. Objects can model concrete things or abstract ideas, in terms of characteristics or in terms of behavior. A software object is a group of elements working together or in succession to perform specific tasks. These elements are data elements, also called instance variables, and functions, also called methods, of the object. Objects are defined by creating "classes", which act as templates that instruct a computer how to construct an actual object. For example, a class might specify the number and type of data variables and the steps involved in methods that manipulate the object. An object created from a certain class is called an "instance" of that class. The class defines the operations and information initially in a instance, while the current state of the instance is defined by operations subsequently performed on it. By analogy to a factory, objects are created by "asking" a class (the factory) to "stamp out" an instance.

The state of an object is represented by the values of its instance variables. The state can be retrieved or updated with accessor methods. Other methods will perform operations associated with an object and may invoke additional methods on the same or other objects.

A feature of object-oriented programming is encapsulation of objects. Encapsulation means that objects hide (encapsulate) their data's internal structure and the algorithms that implement their actions. Instead of exposing these implementation details, objects present interfaces that represent their abstractions. Other features of object-oriented programming are polymorphism and inheritance. As a result of polymorphism, the same method can manipulate objects of different classes inheritance permits classes to inherit methods and instance data from other classes

SUMMARY OF THE INVENTION

The invention described herein is directed to a method for developing an "information manager database" and to a reporting tool for using the database. The information manager database models the components of an object-oriented enterprise model, including its various policies. The reporting tool assists a user in formulating queries and accesses the database to answer the queries.

Thus, one aspect of the invention is an automated method of providing information from a database representing an enterprise and its policies. A computer receives a query about data in the database, with the query calling for at least one method for answering the query. It accesses the database to determine whether the method is affected by a policy change. If so, it provides the user with policy choices, and then receives a policy selection from the policy choices. It answers the query, using a particular implementation of the method. This implementation is based on the policy selection.

The information manager database and the reporting tool permit queries about the enterprise to be answered in the context of policy changes. For example, the database can correctly answer a query such as "What was the average salary of full-time employees during the 1980's?" In this examples the database accommodates any changes in policy that define "full time employee".

In the absence of the present invention, the effect, if any, of different policies depends on the memory of the user. If a policy has changed, the user must remember to apply the correct policy for the time period in question. This significantly limits the usefulness of the database as an analytical tool. However, with the present invention, when a new policy comes into effect, an old policy is not "overwritten" but rather is stored as a different implementation of any method that is affected by the policy. As a result of the invention, a database user is provided with meaningful and correct information rather than simply retrieved data. Answers to queries can be based on whatever policies were in effect at a relevant time or are presently in effect. Thus, the user obtains information having the correct historical perspective rather than misleading data. A brand-new employee acquires the same information as an old-timer with years of acquired knowledge would have.

DETAILED DESCRIPTION OF THE INVENTION

A feature of the invention is the recognition of six different areas of knowledge for successful retrieval of valid information from a database These areas of knowledge are: tool knowledge, data knowledge, data structure knowledge, derived data knowledge, policy knowledge, and analysis skills.

Tool knowledge is knowledge of the commands or language of the reporting tool. Data knowledge is knowledge of the names, definitions, and locations of the data elements in the database. Data structure knowledge is knowledge of how the database's tables or files are related to each other. Derived data knowledge is knowledge of how to combine data elements to get commonly agreed-upon definitions of words. Policy knowledge is knowledge of how business policies change data or the interpretation of data. Typically, policies are a function of change over time, but can also be functions of a particular manager, plant, or other parameter. Analysis skills determine how basic information can be used to provide more complex information and how to interpret data into information.

Figure 1:
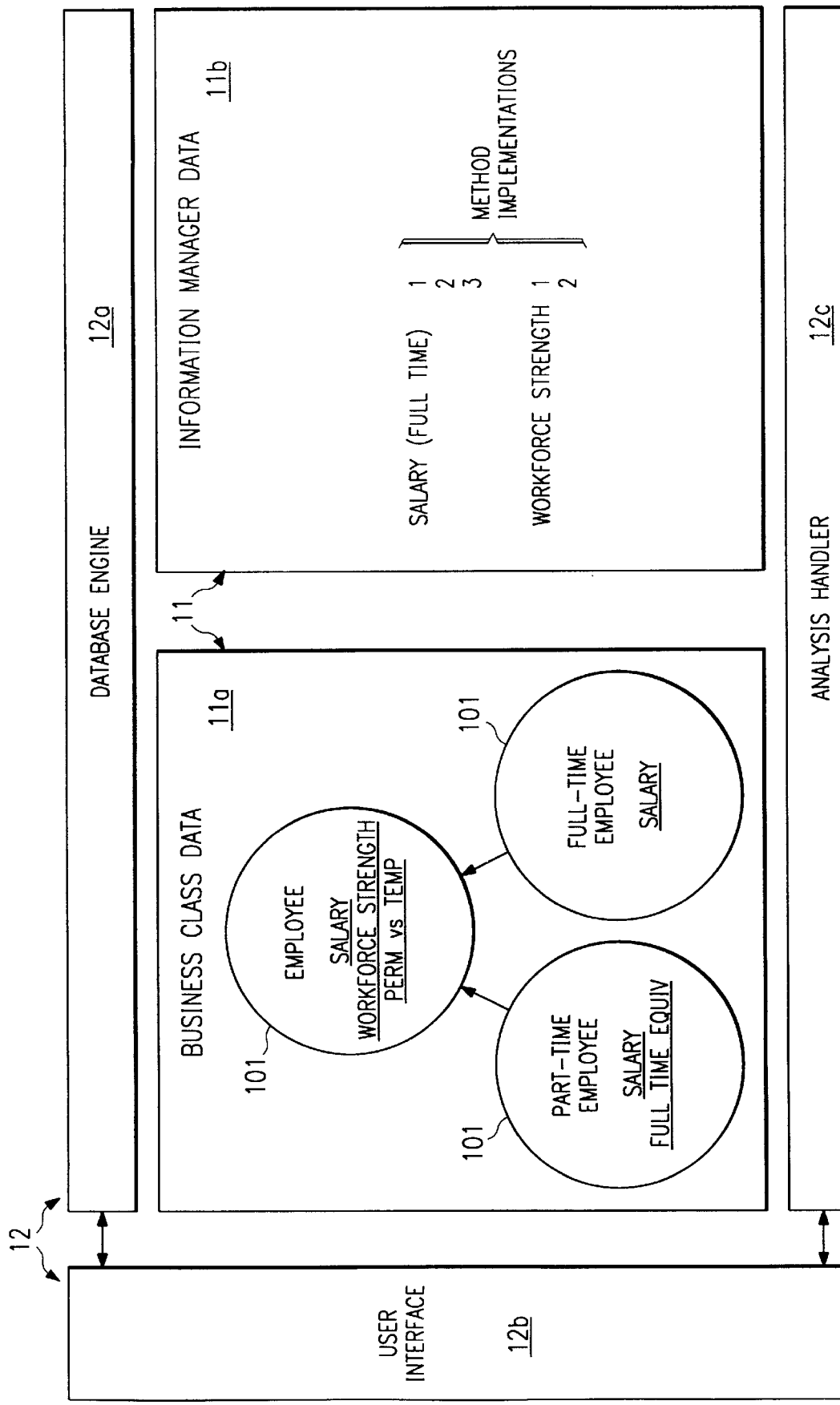
FIG. 1 illustrates a business database, having information manager data that supplements business class data, and a reporting tool for providing information from the database according to the present invention.

FIG. 1 illustrates a business database 11 and a reporting tool 12 for providing information based on data in database 11. Database 11 and reporting tool 12 may be implemented with any type of general purpose computer having a processor, input device, display, and data storage The computer may have a network of user stations. The data storage for database 11 may be implemented with a hard disk drive, a floppy disk drive, a magnetic tape drive, optical storage, or any other type of digital storage device.

Business database 11 has two parts: business class data 11a and information manager data 11b. Although in the example of this description, database 11 models a business enterprise, any enterprise could be similarly modeled.

The business class data 11a models the business with Business Classes 101. Each Business Class 101 represents a set of objects in the business world, such as employees, customers, vendors, assets, or purchase orders. As explained below in connection with FIG. 3, a Business Class 101 defines the data and methods for the objects in the class and is part of a hierarchy of Business Classes 101.

In FIG. 1, only a few Business Classes 101 are explicitly shown: Employees, Full-time Employees, and Part-time Employees. However, in real applications, a typical database would have many more classes. The Fulltime Employee and Part-time Employee classes inherit from the Employee class.

Each Business Class 101 may have one or more methods. In the example of FIG. 1, the Employee class has three methods: Salary, Workforce Strength, and Permanent/Temporary. These methods are used herein for a running example of how the computation of Workforce Strength may be affected by different policies. Workforce Strength is a "static" method, in that it is on the class rather than on objects of the class. However, for purposes of this description, all methods are "on" a particular class, whether by being static or by being on its objects.

As further explained below in connection with FIG. 3, Business Classes 101 are related to information manager data 11b by object-oriented relationships. These relationships facilitate the knowledge of data, data structure, and derived data.

The information manager data 11b represents not merely a "static" state of the enterprise but also represents the enterprise as it might be affected by different policies. More specifically, the information manager data 11b permits methods to be performed differently according to different policies. A method on a class can have different implementations, with the different implementations being the result of different policies. Because of the inclusion of policy data, the data representation of the business is dynamic, in the sense that the enterprise is modeled as being capable of change. The policies may be time-varying, such that they reflect the enterprise's history. This permits database 11 to represent the enterprise through time, as well as in its present state.

In the example of FIG. 1, the Salary method for Full-time Employees has three implementations and the Workforce Strength method has two implementations. In the case of Workforce Strength, one implementation might reflect a policy of including only full-time permanent employees, whereas another implementation might reflect a policy change adding part-time employees having full-time equivalence.

The "reporting tool" 12 is the run-time programming that uses database 11. It includes an engine 12a that, via the interface 12b, handles queries from a user and provides information in response to the queries. The reporting tool 12 is for "ad hoc" reporting, in the sense that it operates on demand by the user as needed.

As illustrated in FIG. 1, the reporting tool 12 also has an analysis handler 12c. Allowable operations and valid relationships are defined by the Business Classes 101. The interface 12b can include a series of queries that assist the user in determining valid conclusions from retrieved data and in using the data to answer the question at hand. The interface 12b leads the user through a series of steps to build a query to return the information required.

Figure 2:
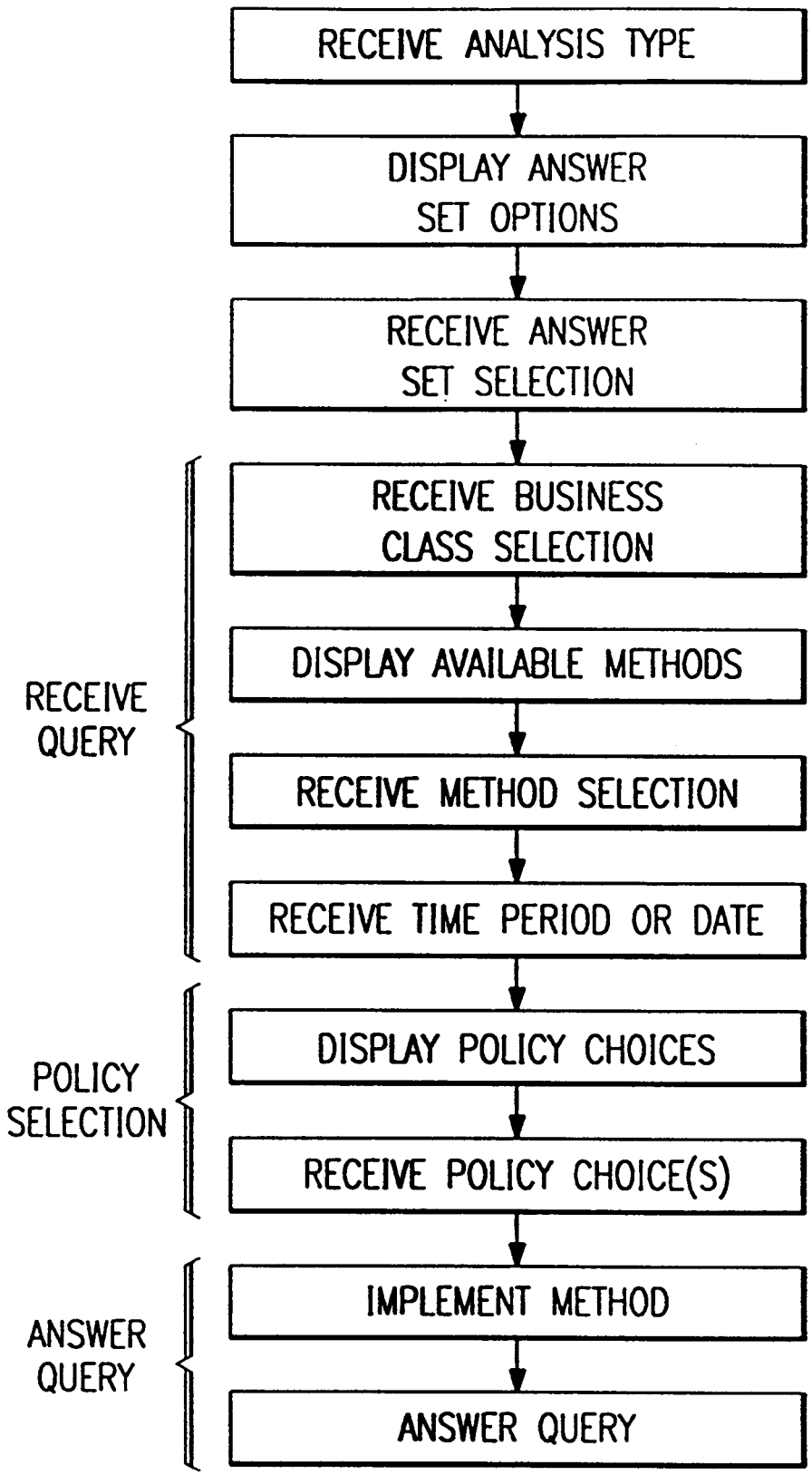
FIG. 2 illustrates how the interface and database engine of FIG. 1 provide information affected by policy changes.

FIG. 2 illustrates the run-time operation of the reporting tool 12 of FIG. 1. First, the user selects a type of analysis to be done, including but not limited to trending, benchmarks, comparison, compare to a standard, or identify a list. This selection determines the input from the user that reporting tool 12 expects, as well as the style of report to be produced. For example, if "compare to a standard" is selected, reporting tool 12 will expect the user to identify information to be compared and also a standard to compare against. The reporting tool 12 will then present options for the form of the answer set of the query that are appropriate for the selected type of analysis. In the "compare to a standard" example, "percent of standard" or "difference of standard" could be presented as options to the user. The user then selects an answer set from these options.

The user then selects one or more Business Classes 101 to be queried. This selection can be made from a list displayed by the interface 12b. Next, the user selects one or more methods to be used on objects in the selected class(es). This selection can be made from a list of methods available on the class(es), displayed by interface 12b. The presentation of the available methods can be abstract. For example, a process that uses several methods to provide information can be designated to the user as a single operation.

The user also enters a time of interest, e.g. a date or time period. Based on the time of interest, the reporting tool determines whether there are any changes in policy that would affect the answer to the query. The stored data and relationships that permit this determination are described below in connection with FIG. 3.

Referring again to FIG. 1, in the example of this description, a user might select Employee from a list of classes and Workforce Strength from a list of methods available on that class. The user might then enter 1992–1996 as the time period during which information is desired.

Referring to both FIGS. 1 and 2, the reporting tool determines that there are different policies that affect the selected method.

The interface then informs the user of these policies. In the Workforce Strength example, the user is informed that there were different policies during the relevant time period that affected Workforce Strength. The interface displays these policies and prompts the user to select a policy to use for the query.

The user may use a single policy for the query or may divide the query into different time periods, each with the appropriate policy. For example, a query asking for "average salaries during the 1980's" can be answered with a single calculation for the entire time period or can be broken down into sub-time periods.

If the user has selected a particular analysis type, analysis handler 12c provides for the appropriate computations.

In the preceding example, the different policies were time varying. However, in other applications, policies could be used for "what-if" queries. For example, information manager database 12b might store policy implementations of hypothetical policies, and the user would then seek information based on "what-if Policy X were in effect?".

Figure 3:
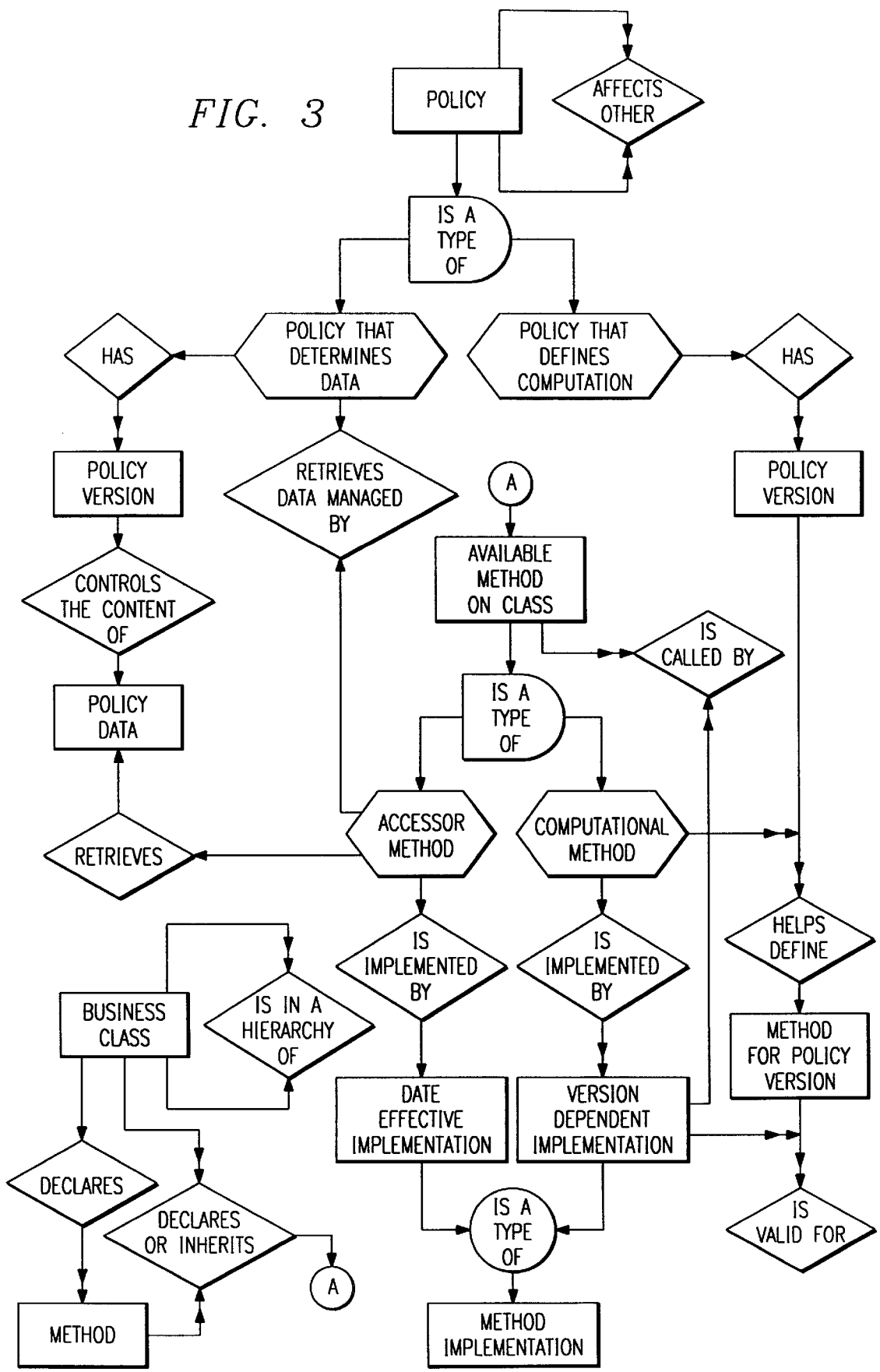
FIG. 3 illustrates how data is structured in the information manager database of FIG. 1.

FIG. 3 is an entity-relationship diagram of how a business enterprise is modeled in the business database 12. The entities and relationship are represented as data stored in a digital storage device.

As discussed above, the enterprise's components are represented by Business Classes. Each Business Class represents a set of real objects or abstractions in the business world. Each Business Class is in a hierarchy of Business Classes, with classes lower in the hierarchy inheriting from classes higher in the hierarchy.

A Business Class may declare one or more Methods. Each Method represents an operation involving business objects in a Business Class or on data managed by the objects. Where a Business Class is in a hierarchy, a Business Class can declare or inherit a Method to make an Available Method on the class. A higher level class might first declare a Method that lower level classes may also access.

The object-oriented representation of the enterprise facilitates the knowledge of data and data structure. More specifically, encapsulation defines allowable operations and relationships for data. For example, where Workforce Strength represents a count of employees of a certain status (such as only full-time employees), the Employee class can determine what employees are to be included when determining Workforce Strength. Likewise, objects of the Employee class know whether they are included. Inheritance and polymorphism allow the user to obtain information about derived data. Inheritance permits objects to have more than one role. For example, any object of a class of employees derived from Employee can be instructed to behave as a general employee object so that a total count of employees could be calculated. Polymorphism permits specialization of operations using a common name. For example, where different kinds of employees are represented by different classes as in FIG. 1, each class is capable of computing salaries according to its own method. The user need only ask for "average salary" rather than for a specific salary calculation designating a particular type of employee.

An Available Method on a class may have one of two types. It may be an Accessor Method or it may be a Computational Method.

An Accessor Method retrieves or updates data. It may retrieve Policy Data that is data valid as of a specific date. It is implemented by a Date Effective Implementation, which is code that uses a date as a parameter.

A Computational Method performs computations that may involve many objects and methods. A Computational Method is implemented by one of various Version Dependent Implementations. A Version Dependent Implementation is code that implements a Computational Method for a specified Policy Version.

Date Effective Implementations and Version Dependent Implementations of methods reflect the two ways that policies affect data, that is, by changing data or by changing interpretations of data. They are types of Method Implementations. Method Implementations are code that implement a Method. Referring again to FIGS. 1 and 2, during a query, a user's policy selection determines which Method Implementation is used to answer the query.

A Policy is an object that represents a business rule or set of business rules that accomplish a business activity When the information manager data 12b is set up in the business database, each policy is given a data representation As stated above, a policy may be a hypothetical policy or actual policy. An actual policy may be time-varying or may vary with some other factor. A Policy's relationship to other data is established consistent with the relationships of FIG. 3. If the business subsequently changes a policy or adds a new policy, that policy is added to the information manager data 12b.

Any Policy may affect other policies. For example, a first Policy might determine that Part-time employees are to be included in Workforce Strength. This might trigger the involvement of a second Policy that categories some Part-time employees as Full-time Equivalent employees for purposes of calculating Workforce Strength.

A Policy may determine data content or rules about computing data derived from other data. Thus, Policy may have one of two types: a Data-Determining Policy or a Computation-Defining Policy.

A Data-Determining Policy determines the value or content of data. It has a Policy Version, which controls the contents of Policy Data. Policy Data has effective dates, which correspond to the effective dates of the Policy Version.

A Computation-Defining Policy is a policy that determines rules about computing data derived from other data. It has a Policy Version, which helps define a Policy Version Method. A Policy Version Method is valid for Version Dependent Implementations. A Version Dependent Implementation calls an Available Method on a Class.

Using the Workforce Strength example, Workforce Strength is an Available Method on the Employee class. It is a Computational Method type of Method. Because its computation may differ depending on policy, it is implemented by various Version Dependent Implementations. When a user selects a Workforce Strength method, the reporting tool determines that there is more than one Version Dependent Implementation to use in answering the query. It presents to the user the different Policy Versions that help define the Version Dependent Implementations. It then accepts the user's selection from these Policy Versions.

As another example, a user might inquire about average salaries per pay period, where "pay period" may be different according to different policies. One policy might result in a different number of pay periods per year than another. The number of pay periods per year is determined by an Accessor Method. An Accessor Method has a single method implementation, but it is a Date Effective Implementation. If the user enters a query whose answer requires the number of pay periods per year, the reporting tool retrieves Policy Data that represents different values for the number of pay periods per year. The Policy Versions that result in this Policy Data are presented to the user, who makes a selection. This results in the correct Policy Data being used for the Date Effective Implementation.

Other Embodiments

Although the present invention has been described in detail, it should be understood that various changes, substitutions, and alterations can be made hereto without departing from the spirit and scope of the invention as defined by the appended claims.

What is claimed is:

1. A method of using a computer to provide information from a database representing an enterprise and its policies, where said information is affected by different policies of said enterprise, comprising the steps of:

receiving, as input to said computer, a query about data in said database, said query calling for the use of at least one method to answer said query;

accessing said database to determine whether said method is affected by a policy change;

providing, as output from said computer, policy choices based on the result of said accessing step;

receiving, as input to said computer, a policy selection from said policy choices; and answering, as output from said computer, said query using an implementation of said at least one method based on said policy selection.

2. The method of claim 1, further comprising the step of receiving time of interest data, and wherein said accessing step is based on said time of interest data.

3. The method of claim 1, wherein said policies are hypothetical policies of said enterprise.

4. The method of claim 1, wherein said method is a computational method and said policy selection determines rules about computing data.

5. The method of claim 1, wherein said method is an accessor method and said policy selection determines data content.

6. The method of claim 1, further comprising the step of displaying available methods in response to said step of receiving a query, and the step of receiving said method as a selection from said available methods.

7. The method of claim 1, wherein said accessing step is accomplished by accessing policy objects.

8. The method of claim 1, further comprising the steps of receiving an analysis type and of providing a choice of answer set types appropriate to said analysis type.

9. A method of using a computer to store and access data from which policy-based queries regarding a business enterprise may be answered, comprising the steps of:

representing, in computer memory, the components of said enterprise with a hierarchy of classes;

storing methods associated with said classes;

representing, in computer memory, policies of said enterprise as policy objects;

storing said objects;

retrieving a particular one of said methods in response to input representing a particular one of said policy objects; and providing output data based on said particular one of said methods.

10. The method of claim 9, wherein said policy objects represent historical policies of said enterprise.

11. The method of claim 9, wherein said policy objects represent hypothetical policies of said enterprise.

12. The method of claim 9, wherein said policy objects represent value of data and wherein said implementations are of accessor methods.

13. The method of claim 9, wherein said policy objects determine how data is computed and wherein said implementations are of computational methods.

14. The method of claim 9, wherein said methods are computational methods and wherein said implementations have different versions depending on different ones of said policies.

15. The method of claim 9, wherein said methods are accessor methods and wherein said implementations have different effective dates depending on different ones of said policies.

* * * * *